(12) United States Patent
VanderVelde et al.

(10) Patent No.: US 7,388,163 B2
(45) Date of Patent: Jun. 17, 2008

(54) METAL RACEWAY SYSTEM

(75) Inventors: Charles F. VanderVelde, Frankfort, IL (US); Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/680,991

(22) Filed: Mar. 1, 2007

(65) Prior Publication Data

US 2007/0144760 A1 Jun. 28, 2007

Related U.S. Application Data

(63) Continuation-in-part of application No. 11/465,518, filed on Aug. 18, 2006.

(60) Provisional application No. 60/710,414, filed on Aug. 23, 2005.

(51) Int. Cl.
*H02B 1/40* (2006.01)

(52) U.S. Cl. ............ 174/480; 174/481; 174/68.3; 174/68.1; 439/207; 52/220.1; 52/220.7

(58) Field of Classification Search ......... 174/480, 174/481, 68.3, 68.1, 60, 67, 95, 97, 99 R, 174/98, 135, 72 R; 220/3.8, 3.3, 3.5, 3.7; 385/134, 135; 52/220.1, 220.3, 220.7, 220.8, 52/239; 439/207, 209, 210, 211, 212, 213
See application file for complete search history.

(56) References Cited

U.S. PATENT DOCUMENTS

| | | |
|---|---|---|
| 2,790,653 A | 4/1957 | Murphy |
| 3,347,275 A | 10/1967 | Murphy |
| 3,404,706 A | 10/1968 | D'Esopo |
| 4,017,137 A | 4/1977 | Parks |
| 5,024,614 A | 6/1991 | Dola et al. |
| 5,086,195 A | 2/1992 | Claisse |
| 5,272,282 A | 12/1993 | Wiesemann |
| 5,336,849 A | 8/1994 | Whitney |
| 5,359,143 A | 10/1994 | Simon |
| 5,614,695 A | 3/1997 | Benito Navazo |
| 5,732,747 A | 3/1998 | Holliday |

(Continued)

OTHER PUBLICATIONS

Wiremold 4000 Series Steel Raceway catalog, pp. 1-12, Oct. 2004.

(Continued)

*Primary Examiner*—Angel R. Estrada
(74) *Attorney, Agent, or Firm*—Robert A. McCann; Christopher S. Clancy (57) ABSTRACT

The present invention is directed to a raceway system including a base, at least two covers a device bracket and a faceplate. The base includes sidewalls having a top wall with a flange member. The covers include a top portion having two ends with a flange member at each end. The flange members of the covers are in mating engagement with the flange members of the base when the cover is coupled to the base. The cover is flush with the base when it is coupled to the base. The device bracket is installed in the base. The covers are positioned over the device bracket and the faceplate is installed over the device bracket. The faceplate overlaps a portion of each cover and extends over a portion of the top walls of the base.

4 Claims, 12 Drawing Sheets

U.S. PATENT DOCUMENTS

| | | |
|---|---|---|
| 5,861,576 A | 1/1999 | Langston et al. |
| 5,879,185 A | 3/1999 | Handler et al. |
| 5,957,414 A | 9/1999 | Perrignon de Troyes et al. |
| 6,150,610 A | 11/2000 | Sutton |
| 6,323,421 B1 | 11/2001 | Pawson |
| 6,350,135 B1 | 2/2002 | Acklin et al. |
| 6,362,420 B1 | 3/2002 | Bacouelle et al. |
| 6,384,336 B1 | 5/2002 | VanderVelde et al. |
| 6,441,304 B1 | 8/2002 | Currier et al. |
| 6,563,046 B1 | 5/2003 | Jarry et al. |
| 6,664,467 B1 | 12/2003 | de la Borbolla |
| D498,211 S | 11/2004 | Thibault |
| 6,881,083 B2 | 4/2005 | Vargas et al. |
| 6,936,766 B1 | 8/2005 | Galasso |
| 7,009,108 B2 | 3/2006 | Vargas et al. |
| 7,151,218 B2 | 12/2006 | Dinh |
| 7,154,052 B2 | 12/2006 | Stempinski |
| 2006/0278422 A1 | 12/2006 | Drane |

OTHER PUBLICATIONS

Mono-Systems, Inc.'s SnapMark SMS4200 Series catalog, pp. 16-23; SMS4200 assembly instruction; SMS4203 assembly instructions, date unknown.

Thomas & Betts SR600 Series Raceway Systems catalog, pp. 22-26, 2002.

METAL RACEWAY SYSTEM

CROSS-REFERENCE TO RELATED APPLICATIONS

This application is a continuation-in-part of U.S. Ser. No. 11/465,518, filed Aug. 18, 2006, which claims priority to U.S. Provisional Application Ser. No. 60/710,414, filed on Aug. 23, 2005, the entirety of which is hereby incorporated by reference.

FIELD OF INVENTION

The present invention relates generally to a metal raceway system and, more specifically, relates to a multiple-channel metal raceway system with a device bracket.

BACKGROUND OF THE INVENTION

Multiple-channel metal raceways are used to route power wiring (or communication cable) along surfaces such as walls, floors, ceilings or on other fixed structures. Raceways provide a convenient way to manage electrical wiring for multiple circuits and/or communication cables while keeping them out of sight and eliminate the physical and network dangers associated with exposure. The multiple-channel raceways thus provide an aesthetic and easy way to route wiring or cables from a power source or network entrance to a desired location. It is important for these systems, which carry both power and communication cables, to meet the existing applicable standards such as U.L. One way for systems to fail to meet the standards is if gaps or other large spaces exist in the system.

Figure 1:
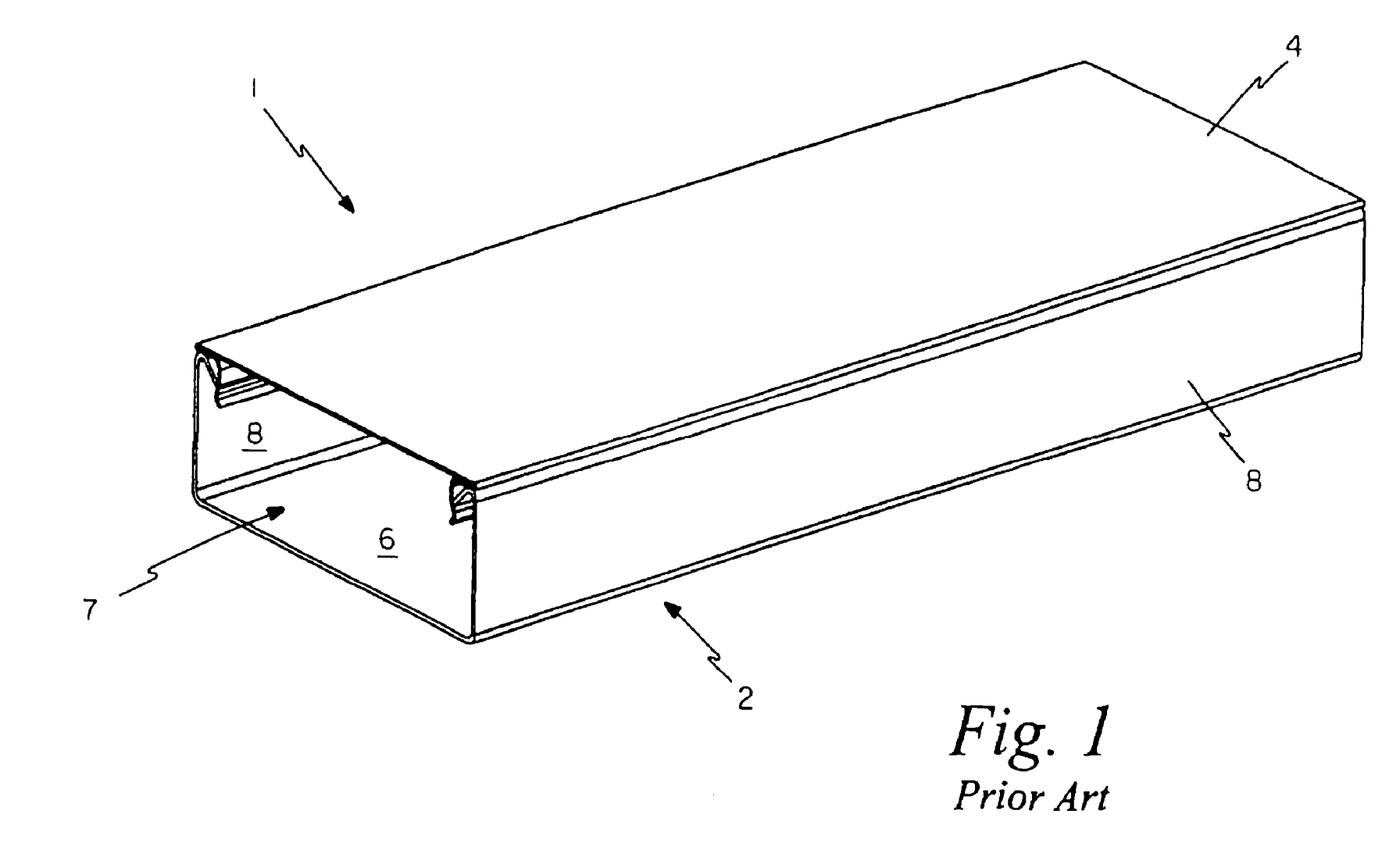
FIG. 1 is a perspective view of a prior art multiple-channel raceway system.

FIG. 1 illustrates one example of current multiple-channel metal raceway designs. As shown, a multiple-channel raceway 1 includes a bottom portion 2 and a cover 4. The bottom portion 2 includes a bottom wall 6 and two sidewalls 8. Cover 4 attaches onto the top of the bottom portion 2, creating a channel 7. During installation of a metal raceway system, faceplates (not shown) having an appropriate number of outlets (electrical power outlets and/or communication outlets) are mounted to the bottom portion and fit into openings created in or between the covers 4. Faceplates should be mounted thereon in a position to overlap a portion of the cover to avoid gaps or seams between the faceplate and covers. In the case of the raceway system shown in FIG. 1, when a standard faceplate is mounted to overlap the covers a gap over the sidewalls will exist. Thus, a specially designed faceplate must be used that fills in the gap.

Prior to installation, the installers generally have ordered all of the parts, including the faceplates, based on a plan that details the layout of the raceway. The layout includes the number and types of faceplates that are needed or desired. However, during installation, the customer may change the layout, including the location, number and type of faceplates. This can be especially frustrating to the installer, because the installer usually cannot purchase the faceplate off-the-shelf at a supplier and must instead order the parts, causing delays in the project.

Therefore, there is a need for a multiple-channel metal raceway that is designed to accommodate readily available faceplates that can be purchased off-the-shelf and still meets the applicable standards.

SUMMARY OF THE INVENTION

The present invention is directed to a multi-channel raceway system that includes a base and covers that are flush with the base when coupled to the base. The base includes sidewalls having a top wall with flange members. The covers include a top portion having two ends with a flange member at each end. The flange members of the covers matingly engage the flange members of the base to enable the covers to be flush with the base. The multi-channel raceway system also includes a device bracket and a faceplate. The device bracket is installed in the base and the covers are positioned over the device bracket. The faceplate is installed over the device bracket and overlaps a portion of the cover. The faceplate also extends over a portion of the top walls of the base when installed on the raceway.

BRIEF DESCRIPTION OF THE DRAWINGS

FIG. 2b is an end view of the multiple-channel raceway system of FIG. 2a;

DETAILED DESCRIPTION OF THE ILLUSTRATED EMBODIMENTS

Figure 2A:
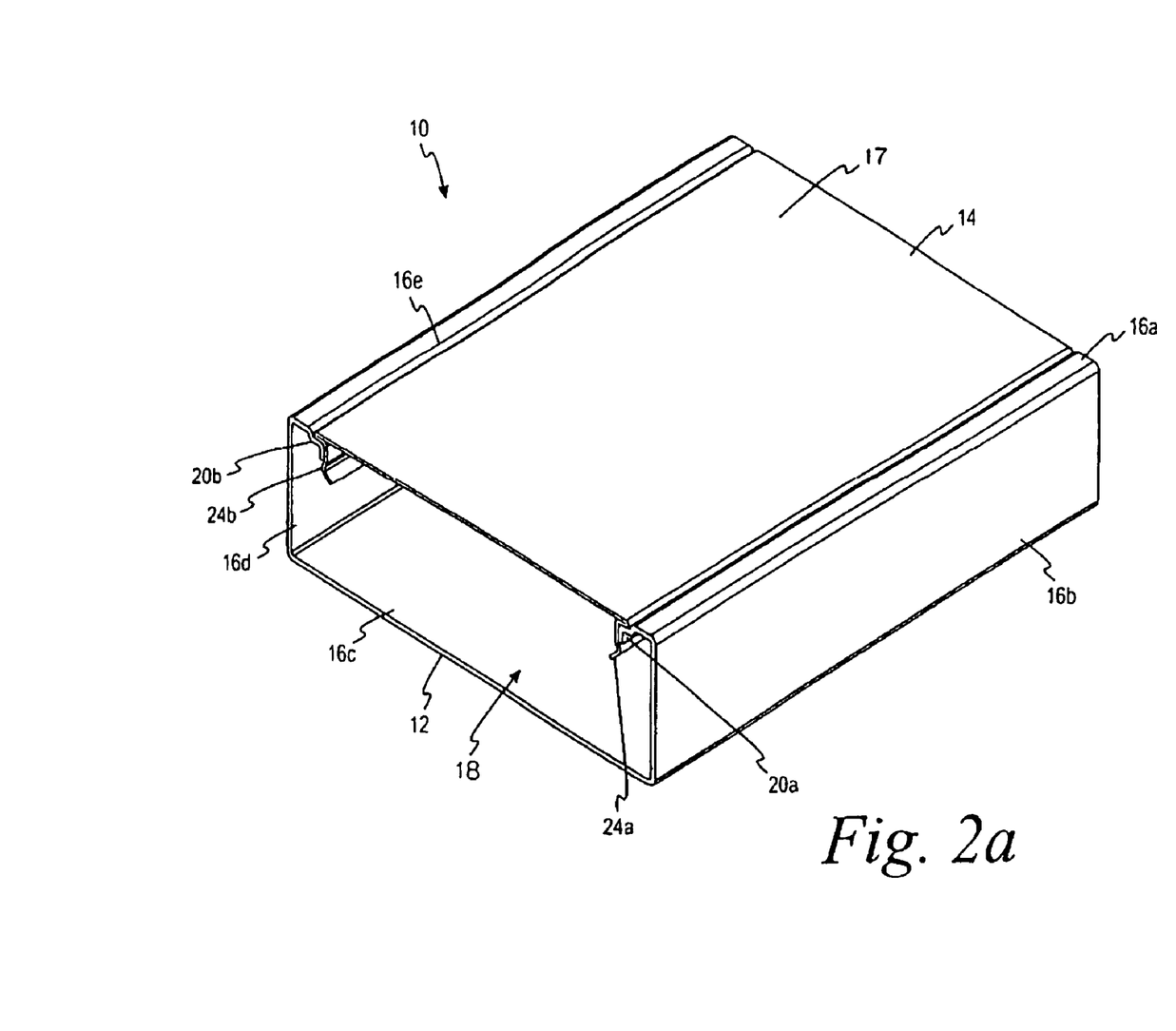
FIG. 2a is a perspective view of a multiple-channel raceway system according to one embodiment of the present invention.
Figure 2B:
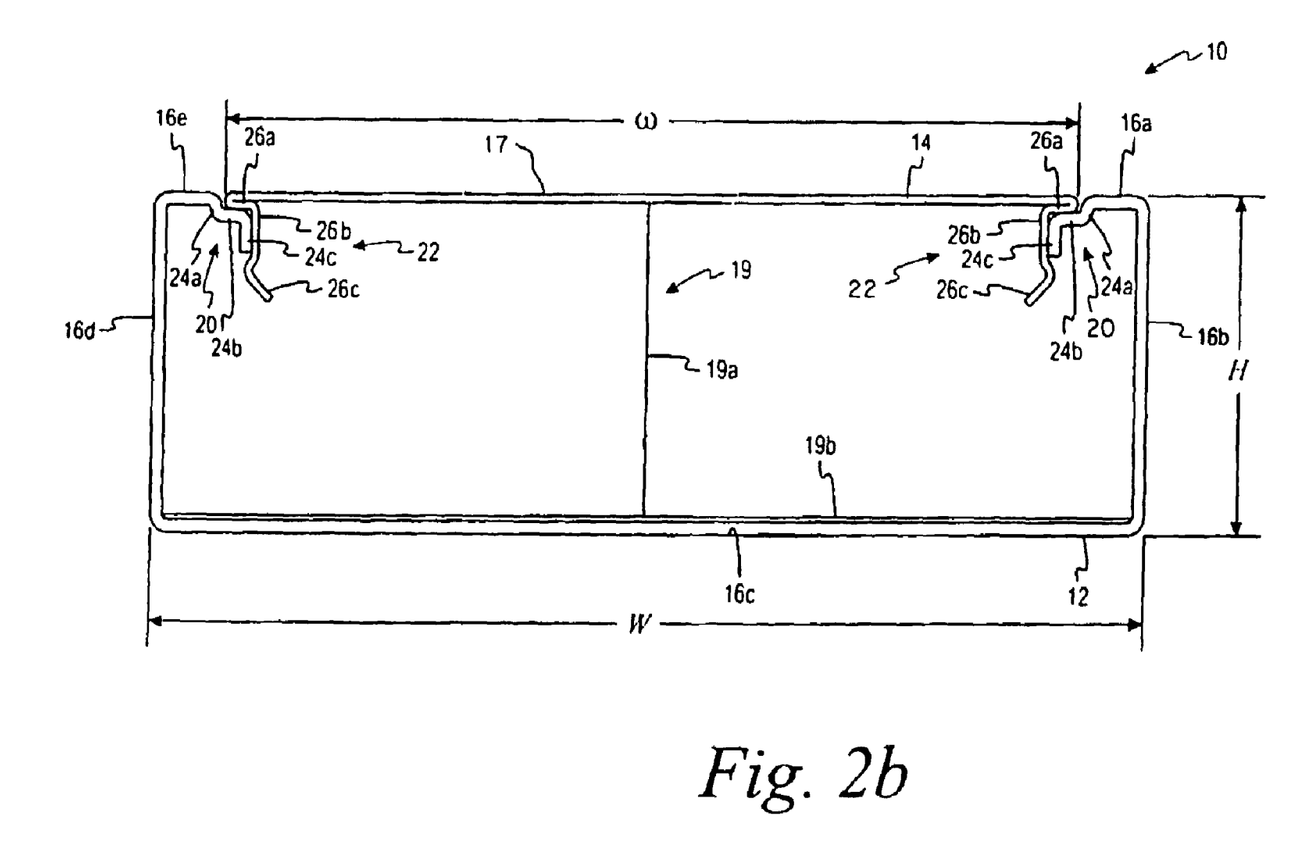

FIGS. 2a and 2b illustrate one embodiment of a multiple-channel raceway 10. The term "multiple-channel raceway" refers to a raceway that has at least one channel and may be divided into multiple channels. In some embodiments, the multiple-channel raceway 10 may only have a large single channel that can accommodate a greater number of cables than a standard "single-channel raceway."

In the embodiments illustrated in FIGS. 2a and 2b, the multiple-channel raceway 10 has a base 12 and a cover 14. According to one embodiment of the present invention, the base 12 is a one-piece, roll-formed raceway that includes five walls 16a, 16b, 16c, 16d, and 16e. The cover 14 includes a top portion 17. When the cover 14 is coupled to the base 12, a channel 18 is created. The channel 18 may be used for receiving cables such as power and/or communication cables.

As shown in FIG. 2b, a divider 19 is inserted into the channel 18. The divider 19 is used to isolate the different types of cables from one another. In the illustrated embodiment, the divider 19 includes a single dividing wall 19a that is parallel to the sidewalls 16b, 16d of the base 12 and a base 19b that abuts the bottom wall 16c of the base 12. Other types of known dividers may also be used. In this embodiment, two sub-channels (or multiple channels) are created. In other embodiments the divider 19 may include any number of dividing walls 19a, creating more sub-channels. Because the base 19b of the metal divider 19 is in contact with the bottom wall 16c of the base 12 the base 12 and the metal divider 19 are electrically bonded. For safety reasons the base 12 is grounded. Thus, the metal divider 19 may also be grounded. If only one type of wire and/or cable is to be used then no divider 19 would be necessary. Also, the cover 14 is electrically bonded to the base 12 and therefore grounded.

As shown in FIG. 2b, one embodiment of coupling the cover 14 to the base 12 will be described. In this embodiment, the base 12 includes a flange 20 and the cover 14 includes a corresponding flange 22. The flange 20 of the base 12 has a shape that substantially corresponds to the shape of the corresponding flange 22. In other words, when the cover 14 is coupled to the base 12, the flange 20 of the base 12 is in mating engagement with the flange 22 of the cover 14.

Specifically, the flange 20 of the base 12 includes three portions; a first downwardly extending portion 24a that extends downwardly into the channel 18 from the top walls 16a, 16e of the base 12; a shelf portion 24b that extends into the channel 18 in a direction that is parallel with the top walls 16a, 16e; and a second downwardly extending portion 24c that extends downward into the channel 18 in a direction that is parallel to the sidewalls 16b, 16d.

The corresponding flange 22 of the cover 14 includes three portions: a first, flat portion 26a that is parallel to the top portion 17 of the cover 14 and underlies the cover 14; a downwardly extending portion 26b that extends downwardly into the channel 18 and is perpendicular to the top portion 17 of the cover 14; and a curved portion 26c that projects downwardly at an angle into the channel 18.

When the cover 14 is attached to the base 12, the flange 20 of the base 12 mates with the flange 22 of the cover 14. More specifically, the first, flat portion 26a of the cover 14 rests on the shelf portion 24b of the base 12 and the downwardly extending portion 26b of the cover 14 abuts the second downwardly extending portion 24c of the base 12. The curved portion 26c of the cover 14 is designed such that a portion of the curved portion 26c is directly below the second downwardly extending portion 24c of the base 12. By having a part of the corresponding flange 22 of the cover 14 underneath the flange 20 of the base 12, the base 12 and the cover 14 are securely engaged. Also, the curved portion 26c of the cover 14 is flexible relative to the flange 20 of the base 12, which allows the cover 14 to releasably engage the base 12. Also, the cover 14 is removable from the base 12.

Other embodiments include those in which a portion of the base 12 mates with a corresponding portion of the cover 14. The above is merely one embodiment of the present invention. In some embodiments, the cover may not be removable. In some embodiments, the cover may be attachable to the base via methods other than mating engagement. In other words, the cover may be attached via welding or a fastener such as a screw.

As can be seen in FIG. 2b, when the cover 14 is mated with the base 12, the top portion 17 of the cover 14 is flush with the top walls 16a, 16e of the base 12. In other words, the top portion 17 of the cover 14 is level with the top walls 16a, 16e of the base 12. Also, the top portion 17 is as high as the top of the sidewalls 16b, 16d. The width W of the entire top area (cover 14 and two top walls 16a, 16e) is between about four inches and six inches, preferably between four and a half inches and five and a half inches. In comparison, the width w, of the top portion 17 of the cover 14 is between about three and a half inches and five inches, preferably between about four inches and four and three quarters inches. By increasing the width W of the overall top of the multiple-channel raceway 10, the installer may now install almost any faceplate having a width less than the total width W of the raceway 10. Prior multiple-channel raceways, such as raceway 1 shown in FIG. 1, only have a width that is the same as the width w of the cover thus decreasing the ability to use any standard off-the-shelf faceplate.

After mounting of base 12 to the desired mounting surface, the installer may then lay the wires and/or cables in place in channel 18 (or sub-channels) prior to the attachment of the cover 14 onto the base 12. In other embodiments, the wires and/or cables may be snaked through the channel 18 (or sub-channels) prior to the attachment of the cover 14 onto the base 12. According to one embodiment, when the base 12, cover 14 and dividers 19 are all attached, they are all electrically bonded to one another as described above.

Figure 3:
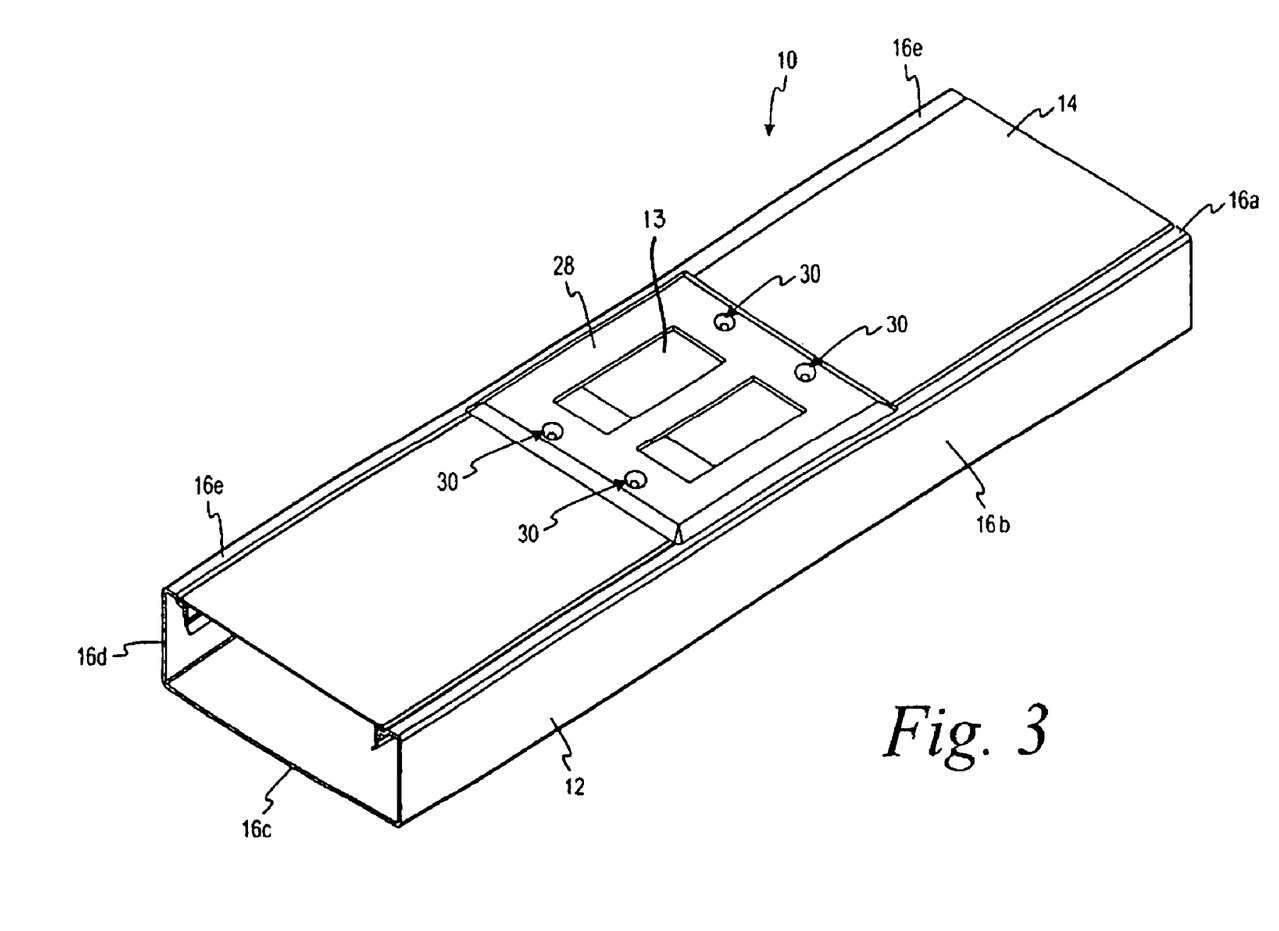
FIG. 3 is a perspective view of the multiple-channel raceway system of FIG. 2a, with a faceplate according to one embodiment of the present invention.

FIG. 3 illustrates a perspective view of one embodiment of a multiple-channel raceway system having a base 12 and multiple covers 14. The covers 14 are coupled to the base 12 leaving an opening 13 for a device bracket and various receptacles (not shown). In this embodiment, a two-gang faceplate 28 with four screw holes 30 is attached to the raceway 10. The faceplate 28 is positioned over the opening 13 such that the faceplate 28 extends slightly over the edge of the cover 14. The faceplate 28 also extends over and is flush with a portion of the top walls 16a, 16e of the base 12. As a result, when the faceplate is installed on the raceway, there are no gaps or openings between the faceplate and the raceway. Additionally, since the top portion 17 of the cover 14 is flush (or level) with the top walls 16a, 16e of the base 12, various standard sized faceplates may be used to cover the opening 13 between the covers in the raceway.

Figure 4:
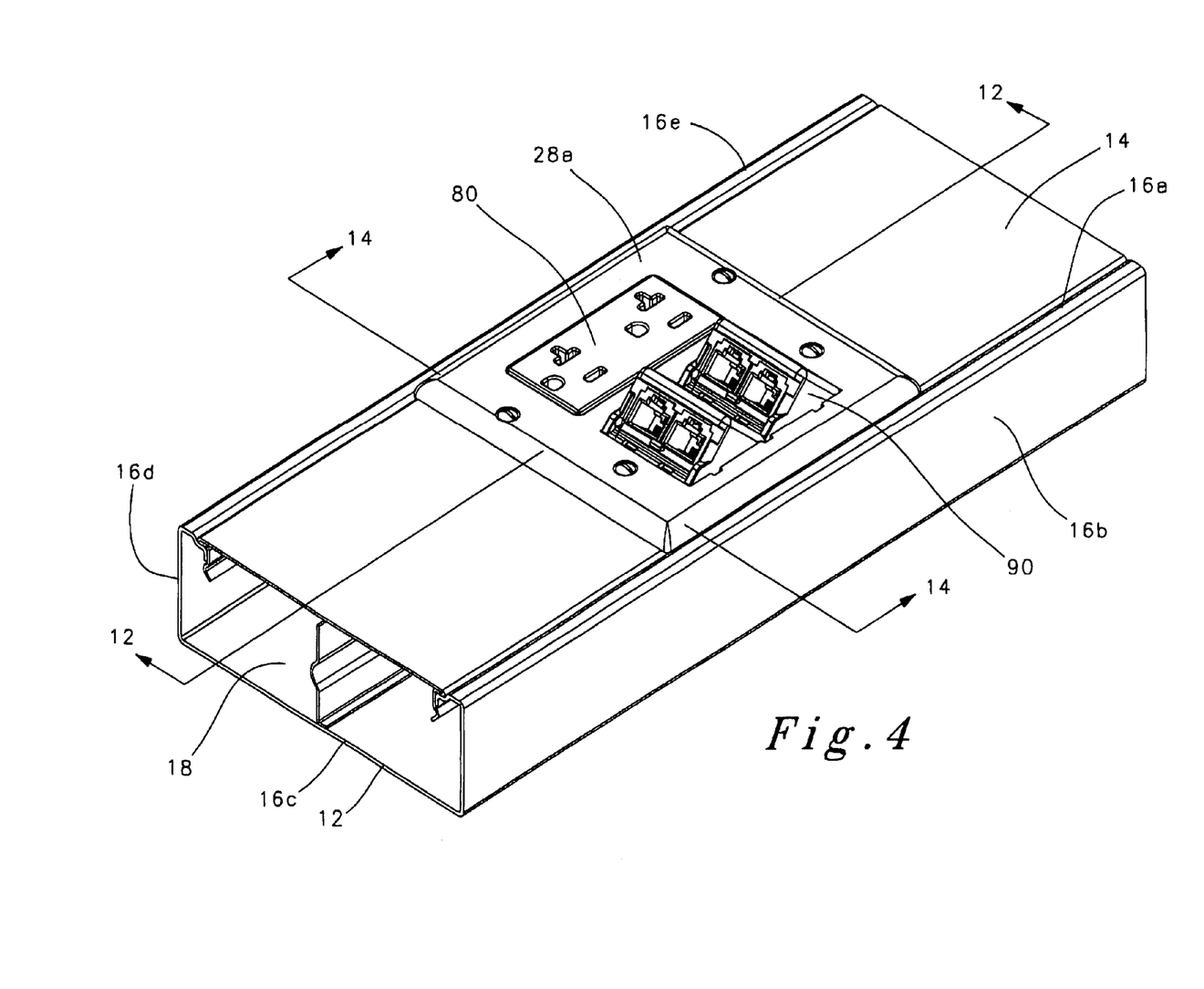
FIG. 4 is a perspective view of the multi-channel raceway system of FIG. 2a with a faceplate and receptacles installed therein.
Figure 5:
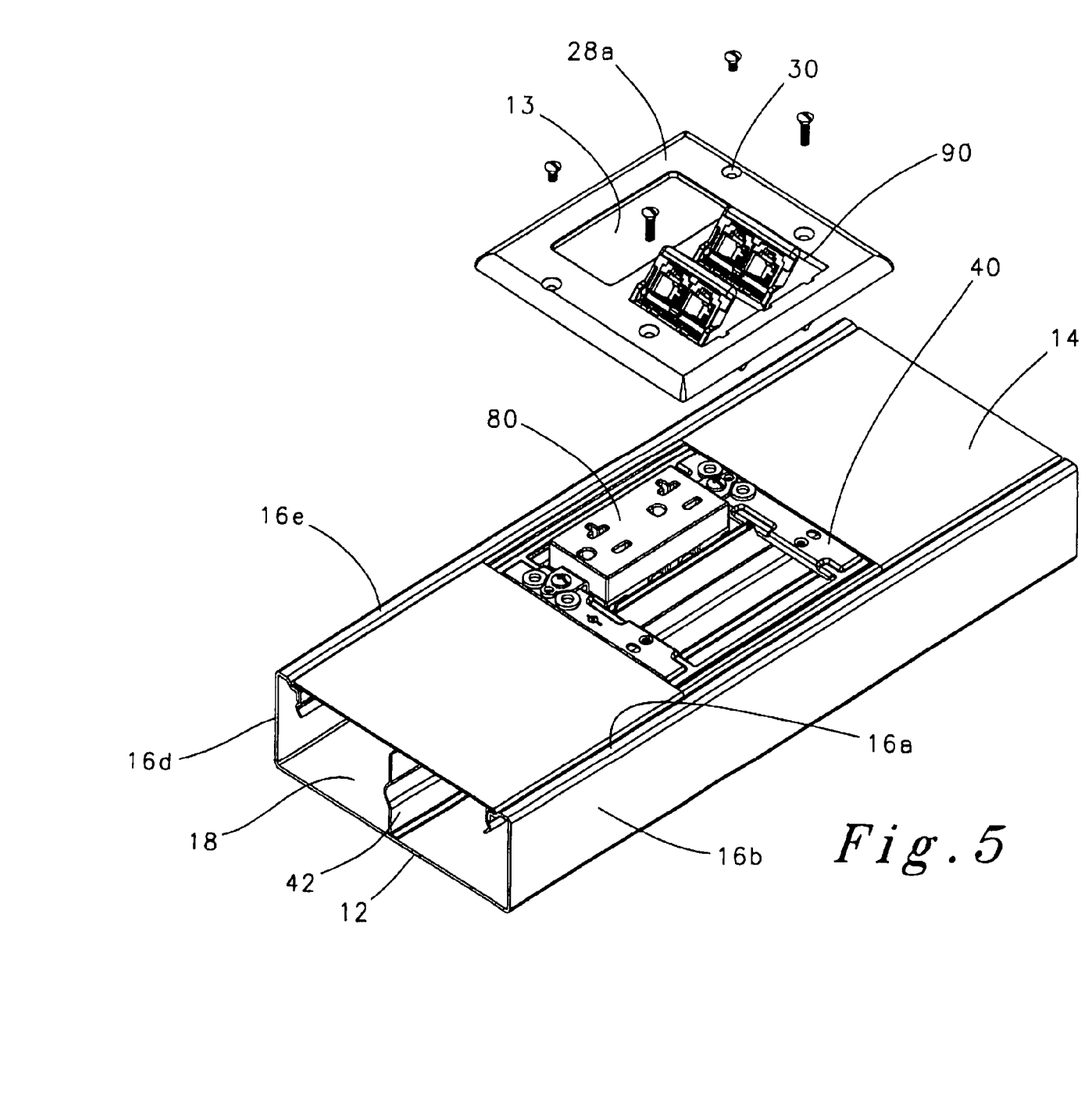
FIG. 5 is a partially exploded view of the multi-channel raceway system of FIG. 4 with the faceplate removed.
Figure 6:
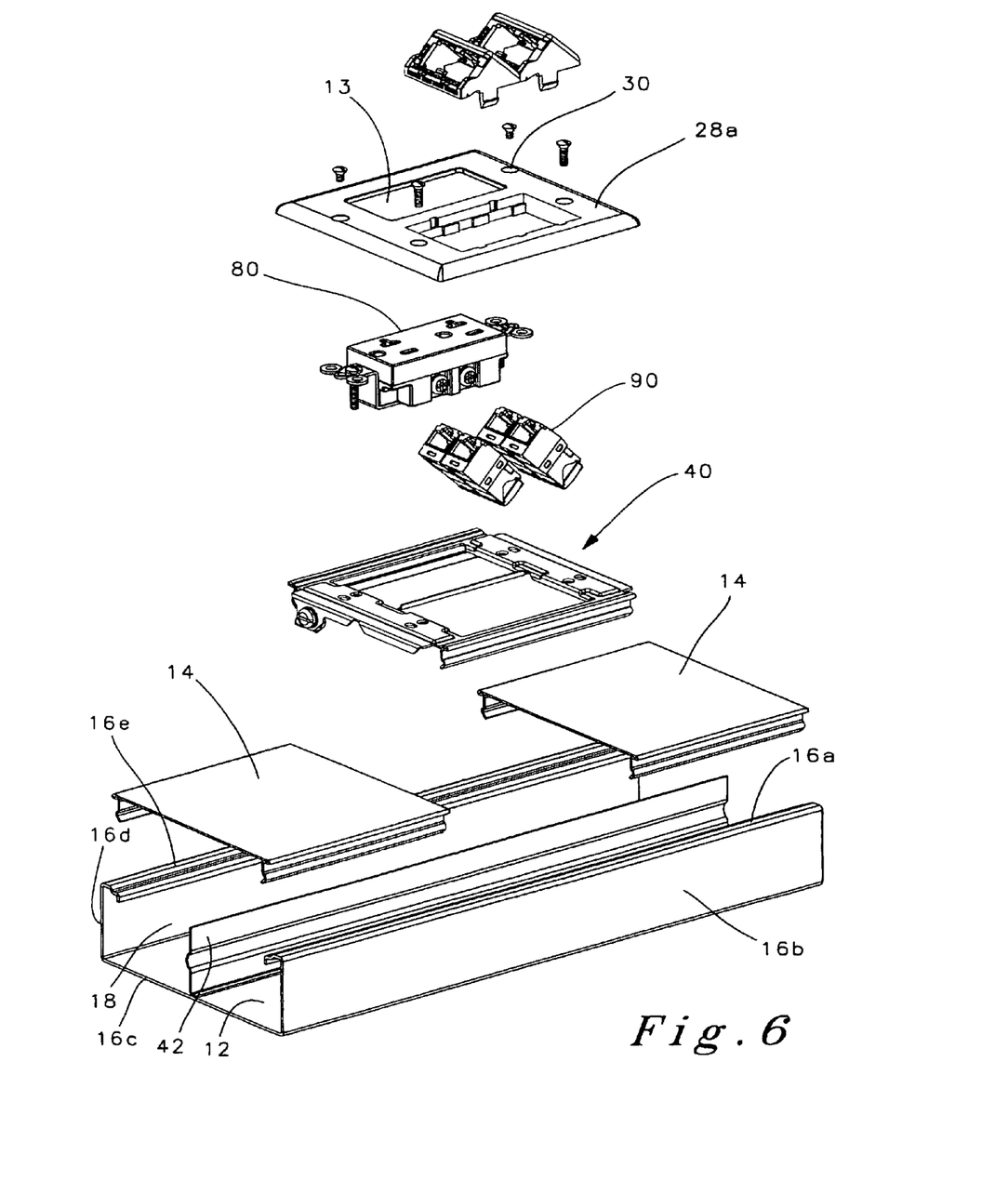
FIG. 6 is an exploded view of the multi-channel raceway system of FIG. 4.

FIGS. 4-6 illustrate the multi-channel raceway system of the present invention with a device bracket 40 installed in the raceway for holding power and data receptacles 80, 90, respectively, and a divider wall 42. A standard size two-gang faceplate 28a for covering power and data receptacles is installed over the device bracket 40 and a portion of the multi-channel raceway covers 14 and base 12.

Figure 7:
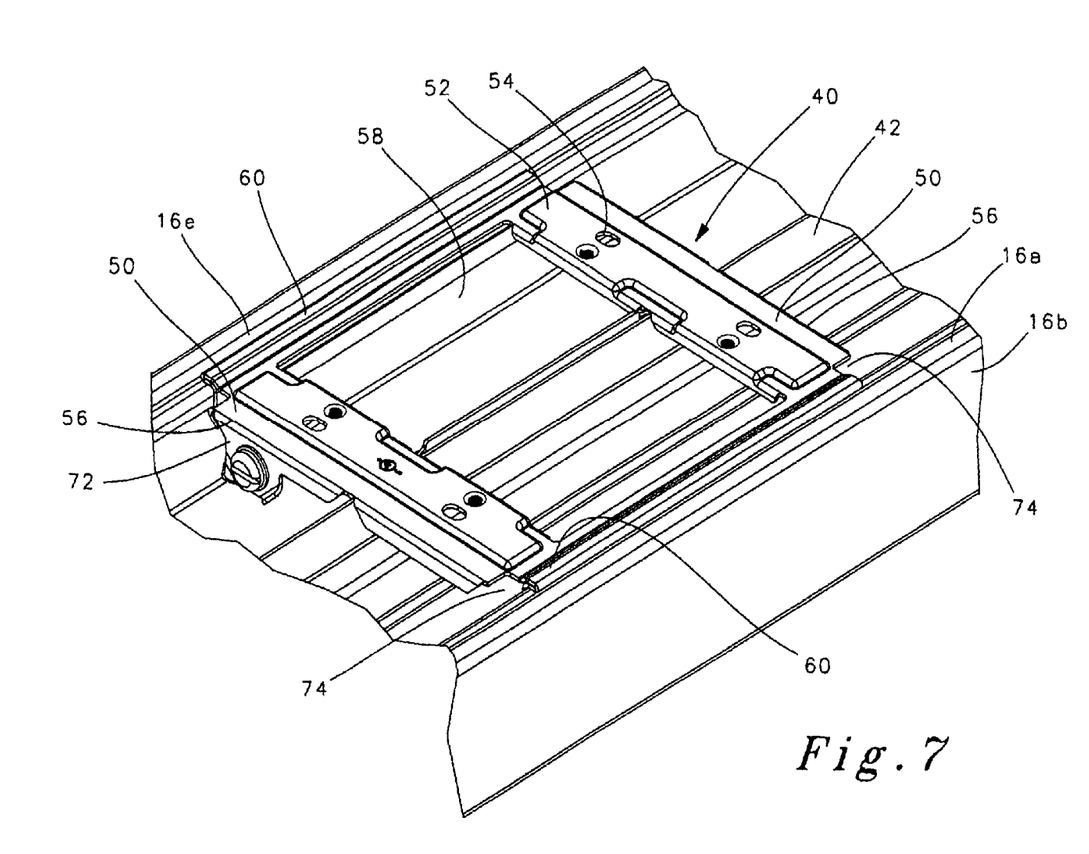
FIG. 7 is a partial perspective view of the multi-channel raceway of FIG. 4 with the device bracket installed in the raceway.
Figures 8, 9:
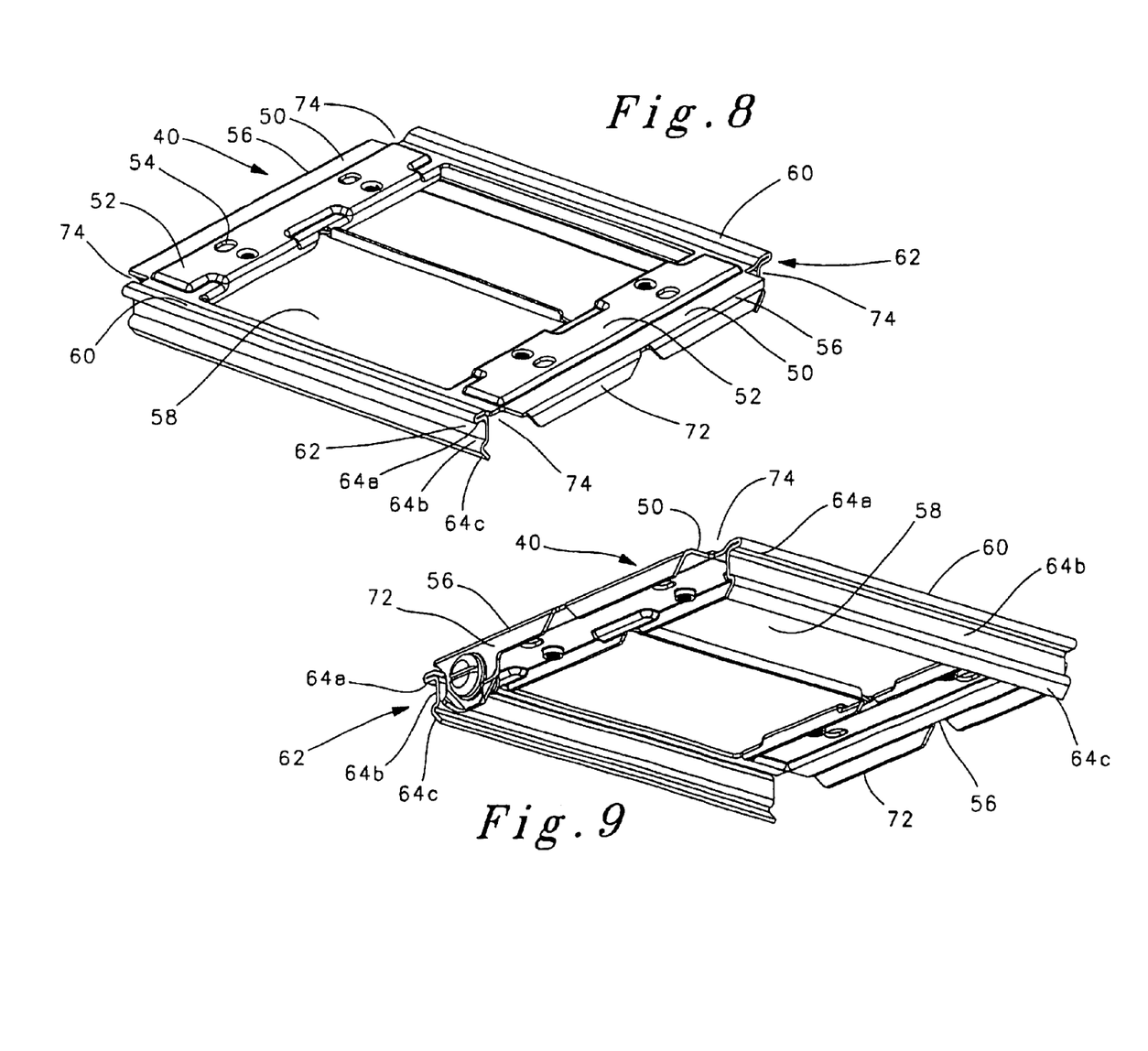
FIG. 8 is a top perspective view of the device bracket of FIG. 7.
FIG. 9 is a bottom perspective view of the device bracket of FIG. 7.

FIG. 7 illustrates the device bracket 40 of the present invention installed in the multi-channel raceway. As illustrated in FIGS. 7 and 8, the device bracket 40 includes a top surface 50 with a protruding embossed area 52 located near each end 56. The device bracket 40 has two openings 58 positioned between the protruding embossed area 52 for receiving the power and data receptacles 80, 90. The protruding embossed area 52 includes a plurality of openings 54 for receiving fasteners to secure the receptacles 80, 90 to the device bracket 40 and for receiving fasteners to secure the faceplate 28a over the device bracket 40.

As illustrated in FIGS. 8 and 9, the device bracket 40 includes raised sides 60 with a flange 62 similar to the flanges 22 along the sides of the cover 14 as illustrated in FIG. 2*b*. The flange 62 of each raised side 60 includes a first flat portion 64*a*, a downwardly extending portion 64*b* and a portion 64*c* that is curved at an angle towards the raceway channel 18.

The ends 56 of the device bracket 40 also include downwardly extending flanges 72 for strengthening the device bracket 40. Each corner of the device bracket includes a notch 74 for providing clearance for the flanges 22 extending from the covers 14 when the covers 14 are installed over the ends 56 of the device bracket 40.

Figure 10:
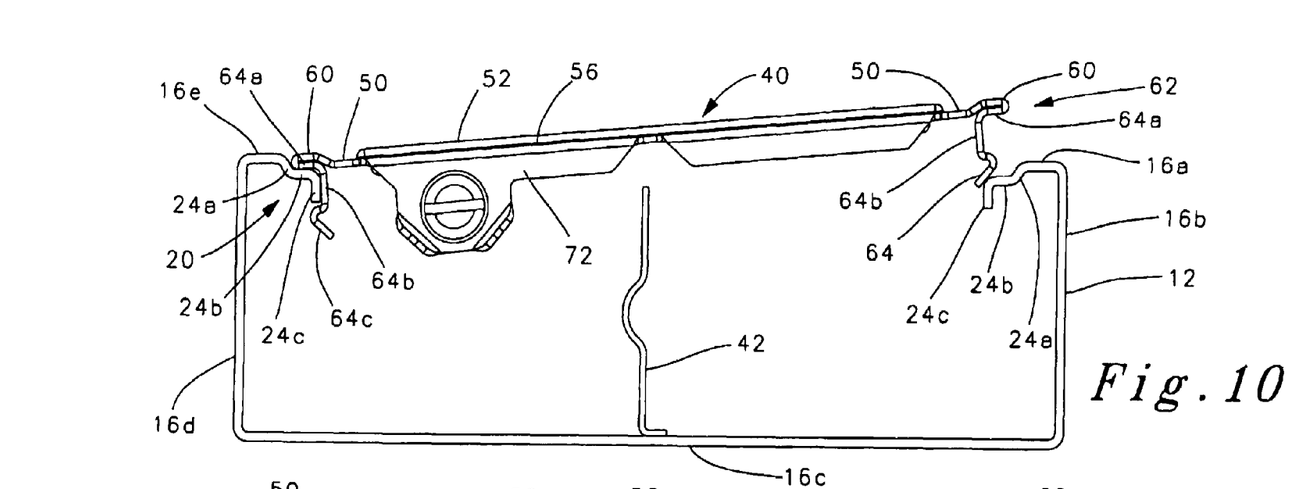
FIG. 10 is an end view of the device bracket of FIG. 7 being installed in the multi-channel raceway.

FIG. 10 illustrates the device bracket 40 being installed into the base 12 of the raceway. The device bracket 40 is snapped into the base 12 by hand. The top surface 50 of the device bracket 40 is disposed below the top walls 16*a*, 16*e* of the base 12 while the raised sides 60 of the device bracket 40 are at the same level as the top walls 16*a*, 16*e* of the base 12 to enable the installation of a standard sized faceplate 28*a*.

Figure 11:
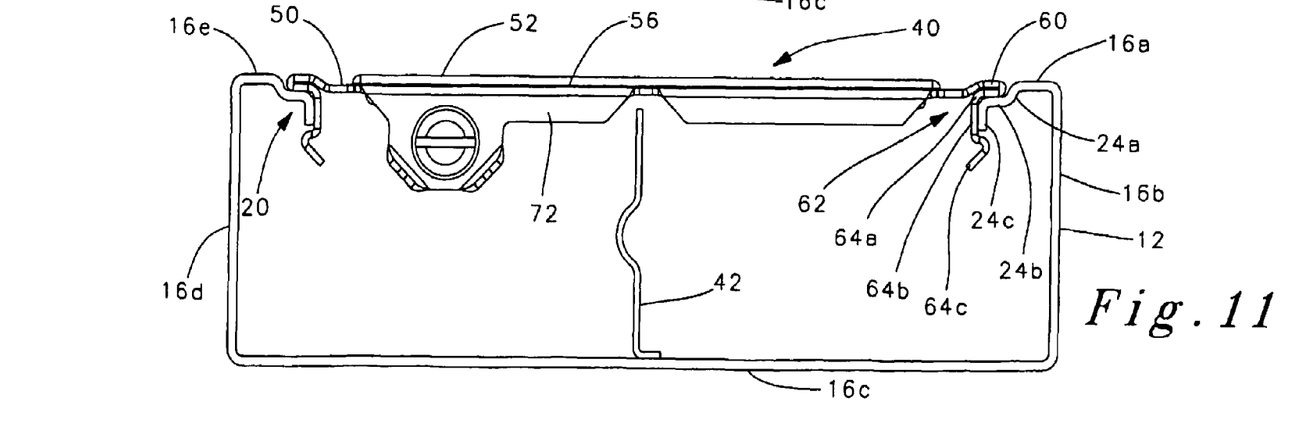
FIG. 11 is an end view of the device bracket of FIG. 7 installed in the multi-channel raceway.

As shown in FIG. 11, the flanges 62 of the device bracket 40 engage the flanges 20 of the raceway base 12 in the same fashion as illustrated and described with respect to the raceway covers 14 engaging the raceway base 12 (see FIG. 2*b*). More specifically, the first flat portion 64*a* of the device bracket flange 62 rests on the shelf portion 24*b* of the base 12 and the downwardly extending portion 64*b* of the device bracket flange 62 abuts the second downwardly extending portion 24*c* of the base 12. The curved portion 64*c* of the device bracket flange 62 is designed such that a portion of the curved portion 64*c* is directly below the second downwardly extending portion 24*c* of the base 12. By having a part of the corresponding flange 62 of the device bracket 40 underneath the flange 20 of the base 12, the base 12 and the device bracket 40 are securely engaged.

After the device bracket 40 is installed in the raceway, the covers 14 are installed over the device bracket 40. The notches 74 in the four corners of the device bracket 40 (see FIGS. 7-9) provide clearance for the flanges 22 of the covers. The notches 74 also act as a positioning stop for the covers 14 when installed over the device bracket 40 and the raceway base 12.

Figures 12, 13:
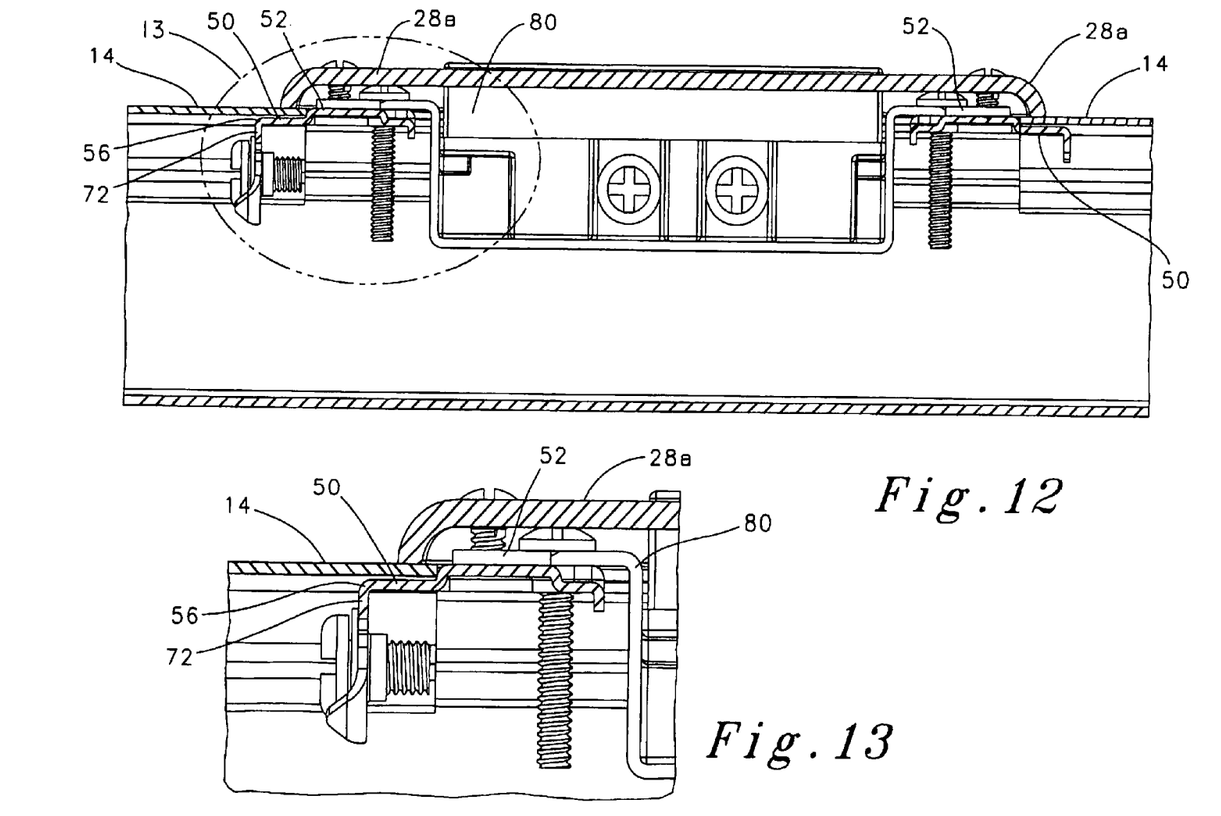
FIG. 12 is a cross-sectional view of the multi-channel raceway system taken alone line 12-12 of FIG. 4.
FIG. 13 is a sectional view of the device bracket installed in the multi-channel raceway system of FIG. 12.
Figure 14:
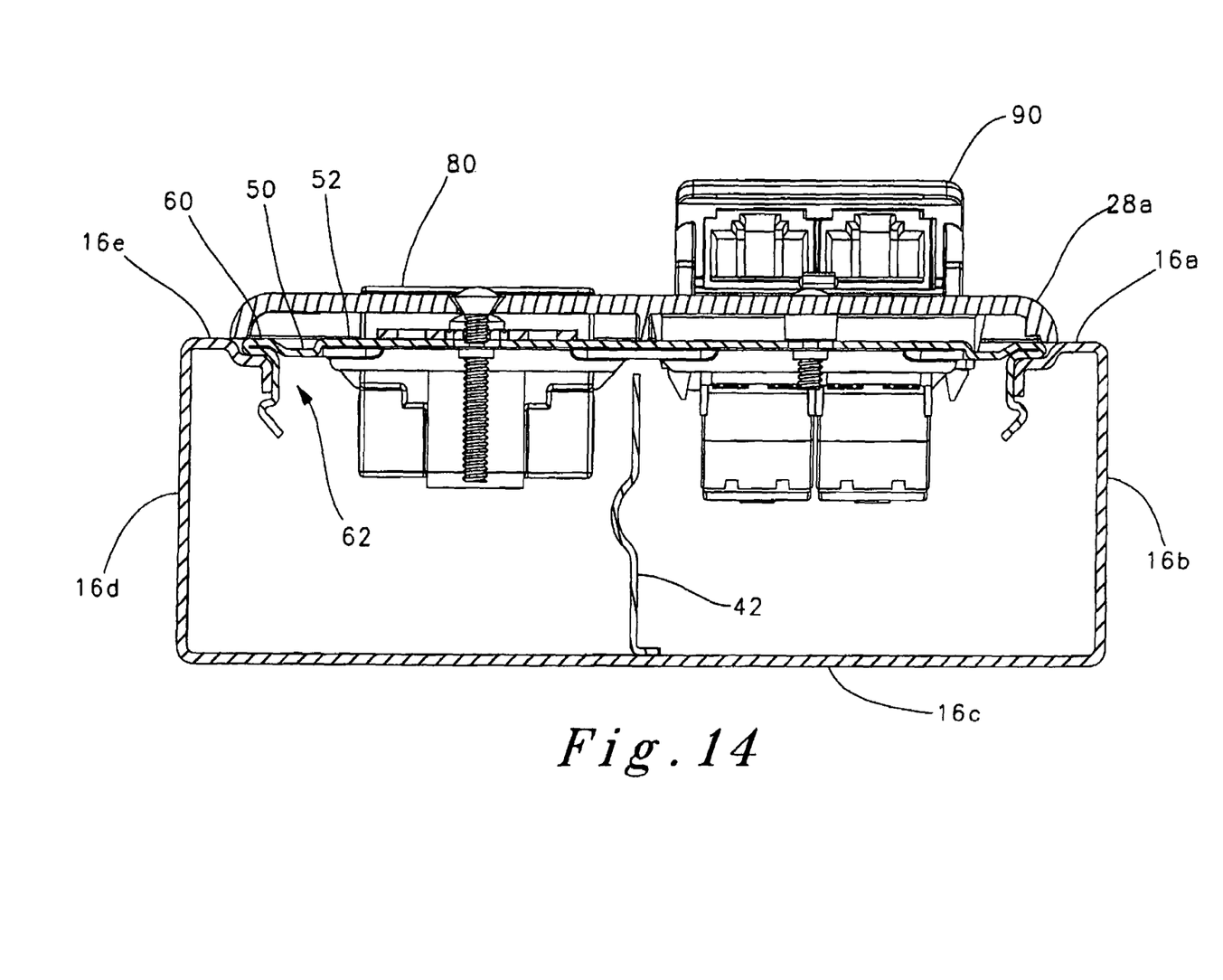
FIG. 14 is a cross-sectional view of the multi-channel raceway system taken along line 14-14 of FIG. 4.

As illustrated in FIGS. 5 and 12-13, a cover 14 is installed over the ends 56 of the device bracket 40 such that each cover 14 is positioned on the top surface 50 of the device bracket 40 adjacent to a protruding embossed area 52. As described above, the covers 14 are flush with the top walls 16*a*, 16*e* of the base 16. A standard two-gang faceplate 28*a* is installed over the device bracket 40 and a portion of the covers 14. As shown in FIGS. 12-14, the faceplate 28*a* overhangs the device bracket 40 and covers 14 to hide any uneven cover cuts that are visible when the covers 14 are positioned over the top surface 50 of the device bracket 40.

Generally, the multiple-channel raceways 10 are sold in lengths of five feet and are then cut to fit the required length. However, in other embodiments, the multiple-channel raceways 10 may be of different lengths. Also in other embodiments, the height of the base 12 may be varied. In one embodiment, the height is between about 1.40 inches and about 1.80 inches. The multiple-channel raceway may be made of metal, such as painted, galvanized or galvanealed cold-rolled steel.

In the illustrated embodiment, a two-gang faceplate is illustrated. However, any faceplate that has at least one dimension that is less than the width W of the raceway 10 may be attached to the multiple-channel raceway. The faceplate may be an off-the-shelf faceplate or a specially ordered faceplate. The faceplate may accommodate any combination of power and/or communication cables.

While particular embodiments and applications of the present invention have been illustrated and described, it is to be understood that the invention is not limited to the precise construction and compositions disclosed herein and that various modifications, changes, and variations may be apparent from the foregoing descriptions without departing from the invention.

What is claimed is:

1. A metal raceway system comprising:
    a metal raceway having a base and at least two covers, wherein the base includes sidewalls, each sidewall having a top wall with a flange member that includes a downwardly extending portion and a shelf portion extending in a direction parallel to the top wall;
    a device bracket installed in the base, the device bracket includes sides with a flange member, wherein the flange members of the device bracket are in mating engagement with the flange members of the base;
    the device bracket having a top surface disposed below the top walls of the base, wherein the covers are positioned over the top surface of the device bracket; and
    a faceplate, wherein the faceplate is positioned over the device bracket thereby overlapping a portion of the covers and extending over a portion of the base.

2. The metal raceway system of claim 1, wherein the at least two covers include a top portion having two ends with a flange member at each end, wherein the flange members of the covers are in mating engagement with the flange members of the base for enabling the covers to be flush with the base.

3. The metal raceway of claim 1, wherein the device bracket has raised sides that are flush with the top walls of the base.

4. The metal raceway system of claim 1, wherein the top surface of the device bracket includes an embossed area for receiving receptacles.

* * * * *